US004001577B2

United States Statutory Invention Registration [19]

[11] Reg. Number: H1577

Hanzlik et al.

[45] Published: Aug. 6, 1996

[54] TONER AND DEVELOPER COMPOSITIONS WITH HIGH SURFACE ADDITIVE LOADINGS

[76] Inventors: Cheryl A. Hanzlik, 316 Loud Rd., Fairport, N.Y. 14450; Charles A. Radulski, 502 Tanner La., Macedon, N.Y. 14502; Cynthia H. Barg, 80 Presque St., Rochester, N.Y. 14609

[21] Appl. No.: 449,130

[22] Filed: May 26, 1995

[51] Int. Cl.[6] ..... G03G 9/08

[52] U.S. Cl. ..... 430/120; 430/110; 430/111; 430/126

[58] Field of Search ..... 430/110, 111, 430/126

[56] References Cited

U.S. PATENT DOCUMENTS

| | | | |
|---|---|---|---|
| 3,590,000 | 6/1971 | Palermiti et al. . | |
| 4,338,390 | 7/1982 | Lu | 430/106 |
| 4,983,488 | 1/1991 | Tan et al. | 430/137 |
| 4,996,127 | 2/1991 | Hasegawa et al. | 430/109 |
| 5,296,324 | 3/1994 | Akagi et al. | 430/111 X |
| 5,437,954 | 8/1995 | Saito | 430/110 |

FOREIGN PATENT DOCUMENTS

| | | | |
|---|---|---|---|
| 85756 | 4/1988 | Japan | 430/111 |
| 257316 | 10/1993 | Japan | 430/111 |
| 2222269 | 2/1990 | United Kingdom | 430/111 |

*Primary Examiner*—Charles T. Jordan
*Assistant Examiner*—Meena Chelliah

[57] ABSTRACT

An imaging process which comprises the formation of an image on an imaging member, development of the image with a toner comprised of resin, pigment, and surface additives, and wherein the toner surface area coverage is from about 30 to about 80 percent; transferring the image developed to a substrate; and optionally fixing the image thereto.

33 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TONER AND DEVELOPER COMPOSITIONS WITH HIGH SURFACE ADDITIVE LOADINGS

BACKGROUND OF THE INVENTION

The invention is generally directed to toner and developer compositions, and more specifically, the present invention is directed to developer and toner compositions with high surface loadings. In embodiments, there are provided in accordance with the present invention toner compositions comprised of resin particles, pigment particles, and with surface additives wherein the toner area surface area is from about 30 to about 80 percent. The present invention is also directed to imaging processes, especially xerographic imaging and printing processes with toners containing additives thereon in an amount that enables coverage of from about 30, and preferably 32 to about 80 percent of the surface area of the toner, and which processes permit excellent toner and image transfer efficiency and reduced image deletion defects. More specifically, in embodiments of the present invention the toner selected displays a high transfer efficiency as a function of the gap, or spacing between the photoconductor and the substrate, such as paper, resulting in decreased image or character deletion counts as compared, for example, to prior art toners with less than or equal to about 17 weight percent surface area coverage. Especially preferred in embodiments of the present invention are toners with an average volume diameter of from about 6 to about 10, and preferably about 7 microns. Also, in embodiments the toner compositions of the present invention possess excellent admix characteristics and maintain their triboelectric charging characteristics for an extended number of imaging cycles exceeding, for example, 500,000 in a number of embodiments.

Toner and developer compositions are generally known. Also known are toners with resin, pigment, usually present in an amount of from about 2 to about 8 weight percent, and wherein the pigment can be carbon black, cyan, magenta, yellow, and the like, and which toner may also contain a charge enhancing additive, reference for example U.S. Pat. Nos. 4,338,390 and 4,298,672. There can also be blended with toner compositions external additive particles including flow aid additives, which additives are usually present on the surface thereof, and wherein the additives are added to the toner in amounts of from about 0.1 to about 1 weight percent, or wherein the toner surface coverage by area is believed to be about from 1 to about 15 percent. Examples of these additives include colloidal silicas, such as AEROSIL®, metal salts and metal salts of fatty acids inclusive of zinc stearate, aluminum oxides, cerium oxides, titanates like strontium titanate, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

Also known are toners of small particle size, for example from about 3 to about 7 microns in average volume diameter, and which toners may minimize paper curl. There is illustrated in U.S. Pat. No. 4,996,127 a toner with an average volume diameter of from 3 to about 7 microns, of associated particles of secondary particles comprising primary particles of a polymer having acidic or basic polar groups, and a coloring agent. The polymers selected for the toners of this '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. Also, note column 9, lines 50 to 55, wherein a polar monomer, such as acrylic acid, in the emulsion resin is necessary, and toner preparation is not obtained without the use, for example, of acrylic acid polar group, see Comparative Example I. In U.S. Pat. No. 4,983,488 is illustrated a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 are obtained. This process is thus directed to the use of coagulants, such as inorganic magnesium sulfate which results in the formation of particles with wide GSD. Also of interest are U.S. Pat. No. 4,797,339, wherein there is disclosed a process for the preparation of toners by resin emulsion polymerization, wherein similar to the '127 patent polar resins of oppositely charges are selected, and U.S. Pat. No. 4,558,108, wherein there is disclosed a process for the preparation of a copolymer of styrene and butadiene by specific suspension polymerization.

SUMMARY OF THE INVENTION

It is an object of the present invention to provide toner and developer compositions with many of the advantages illustrated herein.

In another object of the present invention there are provided toner compositions useful for the development of electrostatic latent images including color images, and wherein the toner contains a high surface area loading or amount of surface additive, for example from about 32 to about 80 surface area coverage (SAC) and whereby the pile height of the resulting copies or prints are reduced, and wherein the toner has an average volume diameter of from about 6 to about 8, and preferably about 7 microns.

In yet a further object of the present invention there are provided humidity insensitive, from about, for example, 20 to 80 percent relative humidity at temperatures of from 60° to 80° F. as determined in a relative humidity testing chamber, positively charged toner compositions with desirable admix properties of 5 seconds to 60 seconds as determined by the charge spectrograph, and preferably less than 15 seconds for example, and more preferably from about 1 to about 14 seconds, and acceptable triboelectric charging characteristics of from about 10 to about 40 microcoulombs per gram.

Additionally, in a further object of the present invention there are provided imaging processes with toner particles comprised of surface additives, and wherein the surface of the toner has these additives on from about 32 to about 80 percent of the surface area (SAC), and which toner enables high transfer efficiencies, such as for example from about 90 to about 100 percent, and more specifically, high transfer efficiencies as a function of the gap, or spacing between the imaging member surface, reference U.S. Pat. No. 4,265,990, the disclosure of which is totally incorporated herein by reference, and the paper to which the developed image is transferred, and wherein there is enabled decreased image deletions.

Another object of the present invention resides in the formation of toners which will enable the development of images in full process color electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 70 copies per minute and wherein the toner pile height is reduced.

Moreover, in another object of the present invention there are provided toners, and imaging processes thereof wherein the toner surface area contains from about 32 to about 80 percent, and preferably 32 to 40 percent of surface additive area coverage, and wherein the toner displays high transfer efficiency as a function of the gap, or spacing between the organic layered photoconductive imaging member and the paper, resulting in decreased deletion counts, especially for 7 micron size diameter toner as compared, for example, to Xerox Corporation 1065 toner, and other toners with less surface additive area coverage, such as 17 percent surface additive area coverage; and also in embodiments the zero (0) gap transfer performance with the toners of the present invention is superior than toners with less surface area coverage, such as 17 percent surface area coverage.

These and other objects of the present invention can be accomplished in embodiments thereof by providing toner compositions comprised of resin particles, pigment particles and surface additives, or a surface additive, and wherein the toner surface area has high coverage. In embodiments, it is important that the toner surface area coverage be from about 32 to about 80 percent. Also, the present invention relates to imaging processes utilizing toners wherein the toner surface area additive coverage is from about 32 to about 80 percent which comprises the formation of an image of a photoconductive imaging member, development thereof with the aforementioned toner transported to the imaging member by carrier particles, corotron transfer to substrate such as paper, and fixing of the image thereto by, for example, heat.

Embodiments of the present invention include an imaging process which comprises the formation of an image on an imaging member, development of the image with a toner comprised of resin, pigment, and surface additives, and wherein the toner surface area coverage is from about 30 to about 80 percent, and preferably from 32 to 40 percent in embodiments; transferring the image developed to a substrate and optionally fixing the image thereto; an imaging process which comprises the formation of an image on an imaging member, development of the image with a toner comprised of resin, pigment, and surface additives, and wherein the toner surface area coverage is from about 30 to about 80 percent; transferring the image developed to a substrate with a corotron and fixing the image thereto; the spacing between the imaging member and the substrate is from about 0 to about 25 microns; the toner tribo is from about 15 to about 30 microcoulombs per gram; the average volume diameter of the toner is from about 7 to about 10 microns, and wherein there results.excellent transfer efficiency of from about 75 to about 95 percent to the substrate; and a toner comprised of resin, pigment, and surface additives, and wherein the toner surface area coverage, that is for example the percentage of the surface of the toner that contains surface additives like fumed silica, is from about 30 to about 80 percent.

With the toners and developers of the present invention, there are enabled in embodiments high transfer efficiencies of the developed image of, for example, from about 80 to about 95 percent. The transfer efficiency in embodiments is a function of the spacing between the corotron and the photoreceptor, for example, and it is preferred that the spacing, or gap be about 0 to about 25 microns. This transfer efficiency enables, for example, reduced, or minimal image deletions.

Illustrative examples of suitable toner resins selected for the toner and developer compositions of the present invention include polyamides, polyimides, polyolefins, styrene acrylates, styrene methacrylate, styrene butadienes, crosslinked styrene polymers, polyesters, extruded polyesters, reference U.S. Pat. No. 5,376,494, the disclosure of which is totally incorporated herein by reference, epoxies, polyurethanes, vinyl resins including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene, and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide, mixtures thereof, and the like. Also, there can be selected as toner resins styrene butadiene copolymers with a styrene content of form about 70 to about 95 weight percent, reference the U.S. patents mentioned herein, the disclosures of which have been totally incorporated herein by reference. In addition, crosslinked resins, including polymers, copolymers, and homopolymers of the aforementioned styrene polymers, may be selected.

As one toner resin, there are selected the esterification products of a dicarboxylic acid and a diol comprising a diphenol. These resins are illustrated in U.S. Pat. No. 3,590,000, the disclosure of which is totally incorporated herein by reference. Other specific toner resins include styrene/methacrylate copolymers, and styrene/butadiene copolymers; PLIOLITES®; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, waxes with a molecular weight of from about 1,000 to about 6,000, such as polyethylene, polypropylene, and paraffin waxes, can be included in, or on the toner compositions as fuser roll release agents. Moreover, it is believed that other known thermoplastic toner resins may be selected.

The resin particles are present in a sufficient, but effective amount, for example from about 70 to about 95, and in embodiments preferably from about 85 to about 91 weight percent. Thus, when 8 percent by weight of pigment or colorant, such as carbon black, is contained therein, about 91 percent by weight of resin is selected.

There is blended with the toner compositions of the present invention external additive particles including flow aid additives, which additives are present on the surface thereof. Examples of these additives include colloidal silicas, such as AEROSIL®, metal salts and metal salts of fatty acids inclusive of zinc stearate, metal oxides like aluminum oxides, cerium oxides, titanium oxides, mixtures thereof, and the like, which additives are generally added in an amount of from 0.2 percent by weight to about 4.0 percent by weight, and preferably in an amount of from 0.4 percent by weight to 2.0 percent by weight to enable surface toner area coverage of from about 30 to about 80, and preferably from about 32 to about 40 percent. Specific surface additives include colloidal fumed silicas, such as the AEROSILS® available from Degussa Chemicals like AEROSIL R972®, AEROSIL R809®, titanium dioxide like P25 (Degussa), and tin oxide. For simplicity, one additive is preferred. However, the surface area coverage may be obtained with more than one additive type or size as, for example, may be needed for other functional aspects of the developer and the toner Several of the aforementioned additives are illustrated in U.S. Pat. Nos. 3,590,000 and 3,800,588, the disclosures of which are totally incorporated herein by reference.

Also, there can be included in the toner compositions of the present invention low molecular weight waxes, such as polypropylenes and polyethylenes commercially available from Allied Chemical and Petrolite Corporation, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

Illustrative examples of pigments or colorants include carbon black, such as REGAL 330®, red, blue, green, brown, magenta, cyan and/or yellow particles, as well as mixtures thereof. More specifically, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these pigment particles are present in the toner composition in an amount of from about 5 percent by weight to about 20, and preferably from about 8 to about 12 percent by weight calculated on the weight of the toner resin particles.

Charge additives that may be selected for the toners of the present invention include those as illustrated in U.S. Pat. No. 4,338,390, the disclosure of which is totally incorporated herein by reference, which additives can impart a positive charge to the toner composition; U.S. Pat. No. 4,298,672, the disclosure of which is totally incorporated herein by reference, which discloses positively charged toner compositions with resin particles and pigment particles, and as charge enhancing additives alkyl pyridinium compounds; and U.S. Pat. Nos. 3,944,493; 4,007,293; 4,079,014; 4,394,430, and 4,560,635, which illustrates a toner with a distearyl dimethyl ammonium methyl sulfate charge additive (DDAMS). The charge additives are present in various effective amounts, such as from about 0.05 to about 5 and preferably from about 1 to about 3 weight percent. The toner triboelectric charge in embodiments is from about 10 to about 30 microcoulombs per gram as determined by the known charge spectrograph, or by the Faraday Cage method.

For the formulation of developer compositions, there are mixed with the toner particles carrier components, particularly those that are capable of triboelectrically assuming an opposite polarity to that of the toner composition. Accordingly, the carrier particles of the present invention are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances such as carbon black in an amount of from about 5 to about 30 percent by weight. Polymer coatings not in close proximity in the triboelectric series can also be selected, reference U.S. Pat. Nos. 4,937,166 and 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected. Also, the coating can contain, dispersed therein, conductive components like conductive carbon blacks in amounts, for example, of from about 20 to about 40 weight percent.

Furthermore, the diameter of the carrier particles, preferably spherical in shape, is generally from about 50 microns to about 1,000, and preferably from 70 to about 100 microns, thereby permitting them to possess sufficient density and inertia to avoid adherence to the electrostatic images during the development process. The carrier component can be mixed with the toner composition in various suitable combinations, such as from about 1 to 5 parts per toner to about 100 parts to about 200 parts by weight of carrier.

The toner composition of the present invention can be prepared by a number of known methods including extrusion melt blending the toner resin particles, pigment particles and other additives, such as charge enhancing additives, followed by mechanical attrition and classification. Other methods include those well known in the art such as spray drying, melt dispersion, extrusion processing, dispersion polymerization, and suspension polymerization. More specifically, the toner compositions of the present invention can be prepared by a number of known methods such as admixing and heating resin particles such as styrene butadiene copolymers and pigment particles in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, preferably of from about 8 to about 12 microns, and more preferably about 7 microns, which diameters are determined by a Coulter Counter. Subsequently, the toner compositions can be classified utilizing, for example, a Donaldson Model B classifier for the purpose of removing fines, that is toner particles less than about 4 microns volume median diameter. Thereafter, there is added to the toner formed the surface additive or additives as illustrated herein. Also, the toner compositions of the present invention can possess a triboelectric charge of from about 10 to about 40 and preferably from about 10 to about 25 microcoulombs per gram as determined by the known Faraday Cage method as determined by the known Faraday Cage method. Admix time for the toners of the present invention are preferably from about 5 seconds to 1 minute, and more specifically, from about 5 to about 15 seconds in embodiments thereof as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute and wherein paper curl is eliminated or minimized, and the toner pile height is as indicated herein.

The toner and developer compositions of the present invention may be selected for use in electrostatographic imaging apparatuses containing therein conventional photoreceptors. Thus, the toner and developer compositions of the present invention can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium, and the like; halogen doped selenium substances; and halogen doped selenium alloys. Other similar photoreceptors can be selected providing the objectives of the present invention are achievable. Preferably the toner compositions of the present invention are selected for full color processes, and also, they can be selected for lithography, it is believed.

The following Examples are being supplied to further define various species of the present invention, it being noted that these Examples are intended to illustrate and not limit the scope of the present invention. Parts and percentages are by weight unless otherwise indicated.

EXAMPLE I

A red developer composition was prepared as follows. Eighty five (85) percent by weight of styrene butadiene, 6.72 percent by weight of styrene acrylate, 6.72 percent of the pigment, LITHOL SCARLET™, 0.56 percent by weight of the pigment, HOSTAPERM PINK E™, and 1.0 percent by weight of distearyl dimethyl ammonium methyl sulfate as a charge control agent to the toner were melt blended in an extruder, ZSK-53, wherein the die was maintained at a temperature of between 130° C. and 145° C., and the barrel temperature ranged from about 80° C. to about 100° C., followed by micronization in an AFG mill and air classification in a classimat to yield toner particles of a size of 9 microns in volume average diameter. The 9 μm toner particles were then blended with 0.0 percent by weight of AEROSIL R972® (0 percent SAC) and 0.0 percent by weight of zinc stearate (no zinc stearate). Subsequently, carrier particles were prepared by powder coating on a nonround Toniolo core with a particle diameter range of from about 75 to about 150 microns, available from Toniolo Company, 1 part by weight of various ratios of KYNAR® and polymethyl methacrylate, and preferably 60/40, which coating was powder coated using kiln processing. The resulting red developer was then prepared by blending 96.0 parts by weight of the coated carrier particles with 4.0 parts by weight of the blue toner in a Lodige blender for about 10 minutes resulting in a developer with a toner exhibiting a triboelectric charge of +15.0 microcoulombs per gram as determined in the known Faraday Cage apparatus. Admix time for substantially uncharged added fresh new toner comprised of the same components as the above prepared toner was less than 30 seconds as determined in the known charge spectrograph.

EXAMPLE II

A red developer composition was prepared as follows. Eighty five (85) percent by weight of styrene butadiene, 6.72 percent by weight of styrene acrylate, 6.72 percent of the pigment, LITHOL SCARLET™, 0.56 percent by weight of the pigment, HOSTAPERM PINK E™, and 1.0 percent by weight of distearyl dimethyl ammonium methyl sulfate as a charge control agent to the toner were melt blended in an extruder, ZSK-53, wherein the die was maintained at a temperature of between 130° C., and 145° C., and the barrel temperature ranged from about 80° to about 100° C., followed by micronization in an AFG mill and air classification in a classimat to yield toner particles of a size of 7 microns in volume average diameter. The 7 micron toner particles were then blended with 0.3 percent by weight of AEROSIL R972® (17 percent SAC) and 0.3 percent by weight of zinc stearate. Subsequently, carrier particles were prepared by powder coating on a nonround Toniolo core with a particle diameter range of from about 75 to about 150 microns, available from Toniolo Company, with 1 part by weight of various ratios of KYNAR® and polymethyl methacrylate, and preferably 60/40, which coating was powder coated using kiln processing. The resulting red developer was then prepared by blending 96.0 parts by weight of the coated carrier particles with 4.0 parts by weight of the blue toner in a Lodige blender for about 10 minutes resulting in a developer with a toner exhibiting a triboelectric charge of +18.0 microcoulombs per gram as determined in the known Faraday Cage apparatus. Admix time for substantially uncharged added fresh new toner comprised of the same components of the above prepared toner was less than 30 seconds as determined in the known charge spectrograph.

EXAMPLE III

A red developer composition was prepared as follows. Eighty eight and forty eight hundredths (88.48) percent by weight of styrene butadiene, 9.71 percent ofthe pigment, LITHOL SCARLET™, 0.81 percent by weight of the pigment, HOSTAPERM PINK E™, and 1.0 percent by weight of distearyl dimethyl ammonium methyl sulfate as a charge control agent to the toner were melt blended in an extruder, ZSK-53, wherein the die was maintained at a temperature of between 130° C. and 145° C., and the barrel temperature ranged from about 80° C. to about 100° C., followed by micronization in an AFG mill and air classification in a classimat to yield toner particles of a size of 6 microns in volume average diameter. The 6 micron toner particles were then blended with III a) 0.6 percent weight of AEROSIL R972® (33 percent SAC) and 0.3 percent by weight of zinc stearate, III b) 1.4 percent by weight of AEROSI L R809® (30 percent SAC), or III c) 1.6 percent by weight of Titania P25 (37 percent SAC) (from Degussa). Subsequently, carrier particles were prepared by powder coating on a nonround Toniolo core with a particle diameter range of from about 75 to about 150 microns, available from Toniolo Company, with 1 part by weight of KYNAR® and polymethyl methacrylate, 60/40, which coating was powder coated using kiln processing. The resulting red developer was then prepared by blending 96.0 parts by weight of the coated carrier particles with 4.0 parts by weight of the above blue toner in a Lodige blender for about 10 minutes resulting in a developer with a toner exhibiting a triboelectric charge of +20.0 microcoulombs per gram as determined in the known Faraday Cage apparatus. Admix time for substantially uncharged added fresh new toner comprised of the same components of the above prepared toner was less than 30 seconds as determined in the known charge spectrograph.

SDMA is the developed toner mass per unit area in $mg/cm^2$ on the photoreceptor or photoconductive imaging member before transfer. TMA is the transferred mass per unit area in $mg/cm^2$ on the paper after transfer. RMA is the residual toner mass per unit area in $mg/cm^2$ on the photoreceptor after transfer. The percent transfer efficiency is as follows:

$$\text{Transfer Efficiency (percent)} = \frac{\text{Transferred mass}}{\text{Transferred mass} + \text{Residual mass}} \times 100$$

Definition of performance requirements for acceptable response to deletion-causing conditions were obtained through print sampling and comparisons. A correlation was found to exist between the number of deletions per hundred impressions and the level of transfer efficiency at a stress gap condition of 76 pm. Numbers used were the combined total of all deletions studied: solid area, debris-centered, line copy and body deletions.

A Xerox Corporation 1065 machine (induction magnetic brush development method) was procured to provide the test bed for the toner materials studies. Additional equipment was designed and built for the collection of developed, residual and transferred mass samples from the photoreceptor, reference U.S. Pat. No, 4,265,990, the disclosure of which is totally incorporated herein by reference, and substrate surfaces. Total toner charge to total mass ratios were obtained from photoreceptor measurements. Standard tribo cage and charge spectra evaluation were accomplished on developer samples. Capabilities for the adjustment of transfer current/field set points were added and process control software was modified for open loop toner dispense control. Corotrons used in the 1065 (pin corotron for transfer and detack, pin-scorotron charging) were characterized in terms of uniformity to minimize degradation in localized regions which could affect data collection and reliability of results.

To investigate the performance of toner materials in gapped situations, an insulating spacer material was attached to the copy substrate to induce a fixed gap between the photoreceptor and the surface of the substrate. This mimics deletion-causing conditions typically encountered when debris, such as carrier beads and paper fibers, induce an air gap in the transfer zone. The gap limits the effective transfer field that can be applied to Paschen breakdown values. An illustration of this specially prepared copy substrate and target is as follows.

The shim materials were selected to represent gap dimensions typically encountered with debris or non-flat substrates. The samples were prepared using 110 pound paper to eliminate gap closure in the transfer zone due to electrostatic forces. The target used in light lens applications contained uniformly dense solid area images to produce constant DMAs for gap transfer measurements. The input density of the solid area target may be changed to provide information on DMA dependencies. The machine is hard stopped with the special gap substrate in the post-transfer, pre-fuser area. The substrate is removed and density measurements performed on the gap regions. Calibration curves of TMA versus unfused toner optical density (Dour) are used to derive mass/unit area values as a function of induced gap and were determined for each and every toner tested. Since this calibration curve could be toner size dependent, the developed toner size was determined via particle size analysis for each test point to insure it did not vary appreciably during the duration of the test. The center target of the copy substrate containing the "no gap" transferred mass was collected and weighed. Residual mass from this central patch can then be removed from the photoreceptor and used to calculate the transfer efficiency as typically done in the transfer field sensitivity studies. In this manner, a quantified response of transfer efficiency as a function of induced gap is derived and used to measure the performance of toners in stress transfer situations. A xerographic test pattern is used to vary the input solid area density of patches of equivalent measured area. The Xerox Corporation 1065 machine is first exercised and then hard stopped with the copy in the prefuser area. A Macbeth RD 517 densitometer is used to read the optical patch density. Mass measurements of DMA and RMA were obtained by vacuuming up the toner from a known area of an image from the photoreceptor before and after transfer. The toner was sucked into a submicron particle filter, and by taking the difference in the filter weight before and after vacuuming up the toner, one could determine the DMA or RMA by dividing the net toner weight in the filter by the total photoreceptor area of the image that was vacuumed off. Similarly, mass measurement is performed to determine the relationship between transferred mass and reflectance density reading. Information is then plotted and a least squares fit performed to generate a calibration curve. The curve fit is then used to determine transferred mass values as a function of induced gap. Plot 4 illustrates typical data collected from this procedure. Layson cell results were monitored and indicated that the particle size of the developed toner populations did not change appreciably during test runs. This procedure was repeated for all the model toners tested.

Other embodiments and modifications of the present invention may occur to those skilled in the art subsequent to a review of the information presented herein; these embodiments and modifications, as well as equivalents thereof, are also included within the scope of this invention.

What is claimed is:

1. An imaging process which comprises the formation of an image on an imaging member, development of the image with a toner comprised of resin, pigment, and surface additives, and wherein the toner surface area coverage is from about 30 to about 80 percent; transferring the image developed to a substrate; and optionally fixing the image thereto.

2. A process in accordance with claim 1 wherein the surface area coverage is from about 32 to about 40 percent.

3. A process in accordance with claim 1 wherein the developed toner image possesses excellent transfer efficiency to the substrate.

4. A process in accordance with claim 1 wherein the developed toner image possesses excellent transfer efficiency of from about 75 to about 95 percent to the substrate.

5. A process in accordance with claim 1 wherein the developed toner image possesses excellent transfer efficiency to the substrate as a function of the spacing between the imaging member and the substrate.

6. A process in accordance with claim 5 wherein the spacing, or gap is from about 0 to about 100 microns, and image transfer is accomplished by a corotron.

7. A process in accordance with claim 1 wherein the toner size is from about 5 to about 8 microns in average volume diameter, and the spacing, or gap between the imaging member and the substrate is from about 0 to about 25 microns.

8. A process in accordance with claim 1 wherein the toner size is from about 5 to about 8 microns in average volume diameter, the spacing, or gap between the imaging member and the substrate is about 0 microns, and substantially no image deletions result.

9. A process in accordance with claim 6 wherein the average volume diameter of the toner is from about 7 to about 10 microns.

10. A process in accordance with claim 6 wherein the average volume diameter of the toner is 7 microns.

11. A process in accordance with claim 1 wherein the average volume diameter of the toner is 7 microns.

12. A process in accordance with claim 1 wherein the image transferred is substantially free of deletions.

13. A process in accordance with claim 5 wherein the image transferred is substantially free of deletions.

14. A process in accordance with claim 13 wherein the transfer efficiency is from about 75 to about 95 percent, the toner tribo is from about 15 to about 30 microcoulombs per gram, transfer is accomplished by a corotron, and the average volume diameter of the toner is from about 7 to about 10 microns.

15. A process in accordance with claim 1 wherein the resin is selected from the qroup consistinq of styrene acrylates, styrene methacrylates, styrene butadienes, and polyesters.

16. A process in accordance with claim 1 wherein the pigment is selected from the group consisting of carbon black, cyan, magenta, yellow, red, and mixtures thereof.

17. A process in accordance with claim 1 wherein the surface additives are selected from the group consistinq of colloidal silica, metal oxides, and mixtures thereof.

18. A process in accordance with claim 17 wherein the metal oxides are titanium dioxide or tin oxide.

19. A process in accordance with claim 17 wherein the colloidal silica is present in an amount of from about 0.1 to about 3 weight percent.

20. A process in accordance with claim 17 wherein the metal oxide is present in an amount of from about 0.1 to about 0.5 weight.

21. A process in accordance with claim 17 wherein the colloidal silica is present in an amount of about 0.3 weight percent.

22. A process in accordance with claim 17 wherein the metal oxide is present in an amount of about 1.3 weight percent.

23. A process in accordance with claim 17 wherein the silica is present in an amount of about 1.4 weight percent, and the surface area coverage is about 32 percent; the silica is present in an amount of about 0.63 weight percent, and the surface area coverage is about 36 percent; or the metal oxide is titanium present in an amount of about 1.6 weight percent, and wherein the surface area coverage is about 40 percent.

24. A process in accordance with claim 23 wherein image transfer is accomplished by a corotron.

25. A process in accordance with claim 1 wherein the toner further includes a charge additive.

26. A process in accordance with claim 1 wherein the toner further includes a charge additive of distearyl dimethyl ammonium methyl sulfate.

27. A toner comprised of resin, pigment, and surface additives, and wherein the toner surface area coverage is from about 30 to about 80 percent.

28. A toner in accordance with claim 27 wherein the resin is selected from the group consistinq of styrene acrylates, styrene methacrylates, styrene butadienes, and polyesters.

29. A toner in accordance with claim 27 wherein the pigment is selected from the group consisting of carbon black, cyan, magenta, yellow, red, and mixtures thereof.

30. A toner in accordance with claim 27 wherein the surface additives are selected from the group consisting of colloidal silica, metal oxides, and mixtures thereof.

31. A toner in accordance with claim 30 wherein the metal oxides are titanium dioxide or tin oxide present in an amount of from about 0.1 to about 3 weight percent.

32. A developer comprised of the toner of claim 27 and carrier particles.

33. An imaging process which comprises the formation of an image on an organic layered photoconductive imaging member; development of the image with a toner comprised of resin, pigment, and surface additives, and wherein the toner surface area coverage is from about 30 to about 80 percent; transferring the image developed to a substrate with a corotron and fixing the image thereto, the spacing between the imaging member and the substrate is from about 0 to about 25 microns, the toner tribo is from about 15 to about 30 microcoulombs per gram, the average volume diameter of the toner is from about 6 to about 8 microns, and wherein there results excellent transfer efficiency of from about 75 to about 95 percent to the substrate.

* * * * *